United States Patent
Sheedy et al.

(10) Patent No.: US 9,462,344 B1
(45) Date of Patent: Oct. 4, 2016

(54) TRICKPLAY CONTROL USING FINITE STATE AUTOMATA

(75) Inventors: Sean Michael Sheedy, Lake Oswego, OR (US); Guy Cherry, Beaverton, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 25 days.

(21) Appl. No.: 13/589,448

(22) Filed: Aug. 20, 2012

Related U.S. Application Data (60) Provisional application No. 61/525,537, filed on Aug. 19, 2011.

(51) Int. Cl.
H04N 21/2387 (2011.01)
H04N 21/472 (2011.01)
H04N 21/6587 (2011.01)

(52) U.S. Cl.
CPC .... H04N 21/47217 (2013.01); H04N 21/2387 (2013.01); H04N 21/47202 (2013.01); H04N 21/6587 (2013.01)

(58) Field of Classification Search
CPC ............ H04N 21/2387; H04N 21/47202; H04N 21/47217; H04N 21/6587
USPC ...................... 725/88–90, 102–103
See application file for complete search history.

(56) References Cited

U.S. PATENT DOCUMENTS

| | | | |
|---|---|---|---|
| 5,504,896 A * | 4/1996 | Schell et al. .................... 725/60 |
| 8,165,446 B2 * | 4/2012 | Bedingfield et al. .......... 386/206 |
| 2002/0077986 A1 * | 6/2002 | Kobata et al. ................... 705/52 |
| 2003/0093792 A1 * | 5/2003 | Labeeb et al. .................. 725/38 |
| 2003/0172376 A1 * | 9/2003 | Coffin, III ....................... 725/22 |
| 2003/0182579 A1 * | 9/2003 | Leporini et al. .............. 713/201 |
| 2003/0233656 A1 * | 12/2003 | Sie et al. ......................... 725/46 |
| 2004/0003398 A1 * | 1/2004 | Donian et al. ................... 725/34 |
| 2005/0010953 A1 * | 1/2005 | Carney et al. ................... 725/61 |
| 2005/0188408 A1 * | 8/2005 | Wallis et al. .................... 725/87 |
| 2005/0216932 A1 * | 9/2005 | Danker ............................ 725/32 |
| 2006/0013557 A1 * | 1/2006 | Poslinski ........................ 386/46 |
| 2006/0168616 A1 * | 7/2006 | Candelore ....................... 725/34 |
| 2007/0088727 A1 * | 4/2007 | Kindig ............. G06F 17/30023 |
| 2007/0256090 A1 * | 11/2007 | Hiron et al. ..................... 725/22 |
| 2009/0031431 A1 * | 1/2009 | Boccon-Gibod ............... 726/30 |
| 2009/0269025 A1 * | 10/2009 | Bedingfield, Sr. ... H04N 21/482 386/248 |
| 2013/0024951 A1 * | 1/2013 | Bjorkengren et al. .......... 726/30 |

* cited by examiner

Primary Examiner — Randy Flynn
(74) Attorney, Agent, or Firm — Bart A. Perkins (57) ABSTRACT

Methods, systems, and computer readable media can be operable to facilitate regulation of trickplay control during playback of streaming multimedia. Trickplay control can be regulated by associating a segment of a multimedia stream with a finite state automaton, associating a state of the finite state automaton with a flag, and controlling transitions from state to state within the finite state automaton by client interactions with the multimedia stream or predetermined time period.

19 Claims, 4 Drawing Sheets

TRICKPLAY CONTROL USING FINITE STATE AUTOMATA

CROSS REFERENCE TO RELATED APPLICATION

This application claims the benefit as a non-provisional application of U.S. Provisional Application Ser. No. 61/525,537, entitled "Trickplay Control Using Finite State Automata," which was filed on Aug. 19, 2011, and is incorporated herein by reference in its entirety.

TECHNICAL FIELD

This disclosure relates to regulating trickplay control during playback of streaming multimedia.

BACKGROUND

Streaming media sessions have become commonplace over modern broadband networks. The content in streaming media sessions may be user-generated, and not commercially valuable, or may be commercially valuable content, also called premium content. For a streaming media source to obtain rights to premium content, payment is usually required. Some streaming media sources may recoup their investment in content by selling advertisements embedded in the content. These advertisements are substantially less valuable if the end user can skip them, or fast forward through them. These actions are generically called trickplay actions. This invention relates to systems and methods to control trickplay activity.

Streaming video sessions can be playlist based. That is, when a viewer requests a video session, the video delivery system constructs a new playlist with advertisements and segments of entertainment content. Each segment in a playlist can be identified as a clip. Clips can include segments of video files and can be created when the playlist is created. The clips and the underlying playlist can be destroyed when the streaming video session ends. However, these constructs do not address mechanisms to control trickplay operations during the streaming video sessions.

BRIEF DESCRIPTION OF THE DRAWINGS

Like reference numbers and designations in the various drawings indicate like elements.

DETAILED DESCRIPTION

In some implementations of this disclosure, systems and methods can operate to provide for dynamic changes to trickplay policy based on the interactions of a viewer with a multimedia stream. Trickplay can refer to the ability of a user to manipulate playback of a multimedia stream (e.g., fast-forwarding, rewinding, skipping, etc.). Flexibility is beneficial when regulating trickplay capabilities. Trickplay is typically controlled on a session-by-session basis or on a click-by-click basis, thereby providing each individual user with independent control of the streaming session. For example, some users might decide to skip or fast-forward certain segments of a video session while other users might view the same segment in its entirety at a default playback speed. Disallowing trickplay during playback can be desirable in some video streaming applications. For example, advertisers might require a streaming media provider to prohibit viewers of a multimedia stream from fast-forwarding or skipping advertisement segments of the stream. Thus, in some implementations, there can be a rule to disallow trickplay during playback of advertisement segments. However, in another example, a streaming media provider might have the flexibility to allow viewers of a multimedia stream to fast-forward or skip advertisement segments of the stream after certain conditions have been met (e.g., the viewer receives the entirety of an advertisement segment a predetermined number of times, the viewer rewinds an advertisement segment, or the viewer pays a fee). Thus, in further implementations, the state of a viewer (e.g., whether the viewer has already viewed the advertisement) can be used to determine whether trickplay is allowed during an advertisement.

Finite state automata (FSA) or finite state machines are powerful compute engines and can be organized in a variety of ways. An FSA typically comprises one or more states and one or more transitions. Each state of an FSA can denote a status or limitation (e.g., whether a specified function is available) to be applied. Each transition of an FSA can describe when the FSA should transition from one state to another. In some implementations, a transition from one state to another can be controlled by a predetermined input or condition. For example, a transition from one state to another can be triggered when a specified client-interaction with a multimedia stream occurs.

Figure 1:
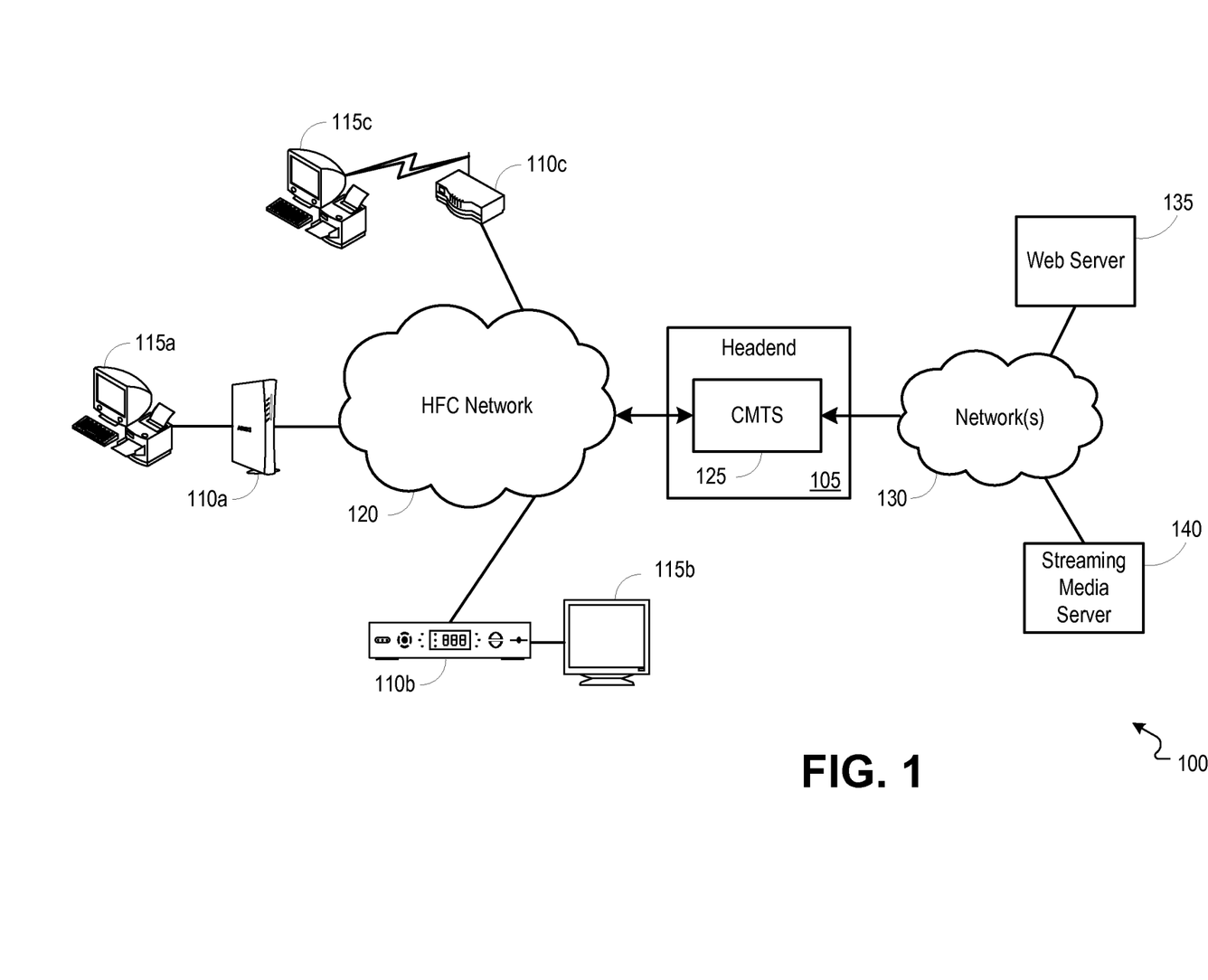
FIG. 1 is a block diagram illustrating an example network environment operable to facilitate regulating trickplay control during playback of streaming multimedia.

FIG. 1 is a block diagram illustrating an example network environment 100 operable to facilitate regulating trickplay control during playback of streaming multimedia. In some implementations, a headend 105 can provide video and/or data service(s) to customer premise equipment (CPE) devices 110a-c in one or more subscriber groups (e.g., service group(s)). The CPE devices can include, for example, a cable modem 110a, a set top box 110b, or a wireless router including an embedded cable modem 110c, among many others (e.g., digital subscriber line (DSL) modem, video game console, digital versatile disc (DVD) player, mobile communications device, etc.). A cable modem 110a can facilitate communications between the headend 105 and a computer 115a. A set top box 110b can facilitate communications between the headend 105 and a television 115b, or a digital video recorder (DVR). A wireless router 110c can facilitate wireless communications between a computer 115c and a headend 105.

The CPE devices 110a-c can communicate with the headend 105 via a broadband network, such as a hybrid fiber-coax (HFC) network 120. The headend 105 can include devices such as a cable modem termination system (CMTS) 125 and/or an edge quadrature amplitude modulation (EQAM) device (not shown), or a combined or converged device (not shown) including multiple edge and/or video or data processing functionalities. Such devices can operate to facilitate communications between a network(s) 130 and the CPE devices 110a-c. In various implementations, the network(s) 130 can include one or more networks internal to the headend and/or one or more networks external to the headend (e.g., one or more extranets, the Internet, etc.).

In some implementations, a client can access streaming multimedia through a website, or other interface, providing a link to the streaming multimedia. In some implementations, the client can request the multimedia stream by interacting with the link to the streaming multimedia (e.g., clicking on the link). In other implementations, a web server 135 (e.g., a web server hosting the website which provides the link to the streaming multimedia) can request the multimedia stream from a streaming multimedia server 140. In some implementations, the streaming multimedia server 140 can break the requested multimedia file into segments and can send the segments to the one or more CPE devices associated with the client using real-time protocols (e.g., real-time transfer protocol (RTP), real-time streaming protocol (RTSP), real-time transport control protocol (RTCP), etc.). In some implementations, an application on the client's one or more CPE devices (e.g., a browser plugin, standalone player, Flash application, etc.) can decode and display the multimedia segments as they are received. The client's one or more CPE devices can discard the received multimedia segments after decoding and displaying them.

In some implementations, the streaming media server 140 can build a playlist for a requested multimedia stream. This playlist can include segments of the requested multimedia stream and advertisement segments interspersed between segments of the requested multimedia stream. In some implementations, the playlist can be streamed to a CPE device as the playlist is being built. For example, the beginning of the playlist (e.g., the first segment(s) of the multimedia stream) can be built by the streaming media server and can then be streamed to a CPE device. In this example, after the beginning of the playlist is streamed to the CPE device, the streaming media server can build the next segment(s) of the playlist and stream the next segment(s) to the CPE device. In this example, a client can view the multimedia stream as it is received in segments rather than waiting to view the stream until it is received in its entirety.

In some implementations, the streaming media server 140 can associate the playlist segment(s) with one or more trickplay rules. For example, the playlist segment(s) can include a packet classifying the segment(s) (e.g., classifying the segment as a media segment or an advertisement segment). In another implementation, the playlist segments can include a packet identifying an FSA associated with the segment. For example, a packet in the playlist segment can instruct a CPE device to allow client interface with the segment according to an FSA (e.g., an FSA controlling trickplay availability and functionality).

Figure 2:
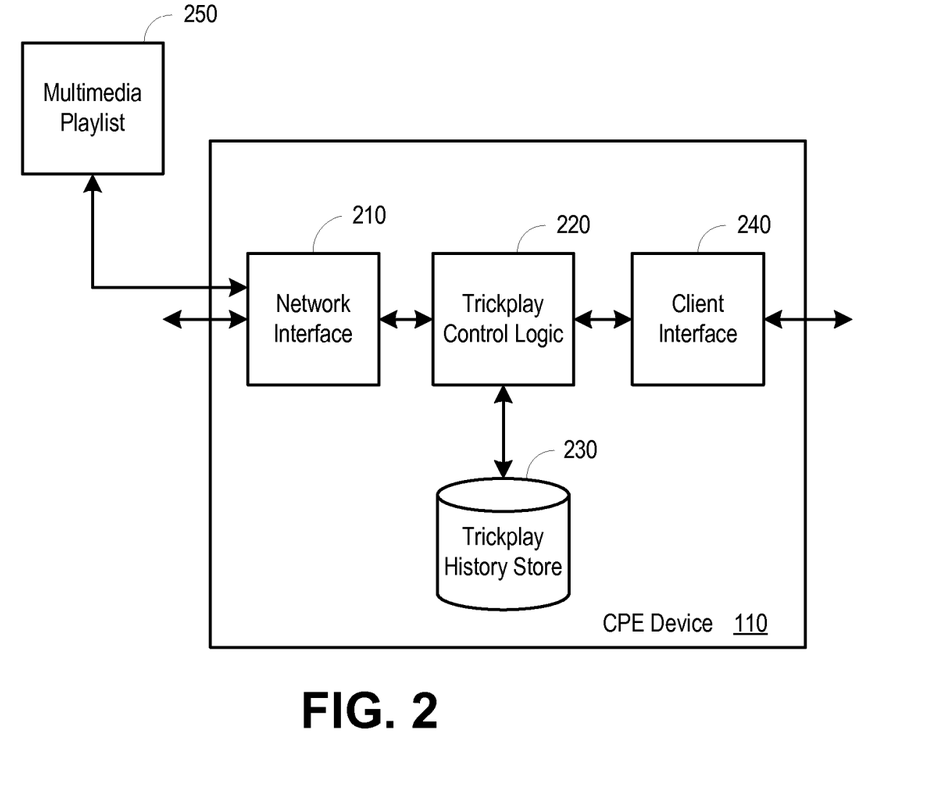
FIG. 2 is a block diagram illustrating an example CPE device operable to facilitate regulating trickplay control during playback of streaming multimedia.

FIG. 2 is a block diagram illustrating an example CPE device 110 operable to facilitate regulating trickplay control during playback of streaming multimedia. The CPE device 110 can include a network interface 210, a trickplay control logic 220, a trickplay history data store 230 and a client interface 240. The network interface 210 (e.g., an HFC interface) can be used to provide an interface to a network (e.g., an HFC network 120 of FIG. 1). It should be understood that in other devices, the network interface 210 can be a generic network interface to a local area network (LAN) or wide area network (WAN) operating with any suitable protocol. In some implementations, the network interface 210 can be used to access a file comprising a streaming video session (e.g., multimedia playlist 250).

In some implementations, the trickplay control logic 220 can be used to identify a trickplay rule (e.g., an FSA) associated with a segment of a multimedia stream. As an example, a trickplay rule associated with a received advertisement segment can prohibit a client from using the fast-forward or skip function during playback of the advertisement segment until the advertisement segment has been received a predetermined number of times by the client. In this example, data regarding the number of times a CPE device 110 has received an advertisement segment can be stored in the trickplay history data store 230. In some implementations, after a trickplay rule is recognized in a multimedia stream, the trickplay control logic 220 can determine whether a condition of the trickplay rule has been met, and can accordingly set the trickplay functions available to the client during playback of the segment associated with the identified trickplay rule. For example, if the trickplay control logic 220 determines that the condition associated with an identified trickplay rule has not been met, Boolean flags within the CPE device 110 can be set to prohibit the client from using certain trickplay functions (e.g., fast-forward, skip, etc.) during playback of the multimedia segment associated with the trickplay rule.

In some implementations, the trickplay history data store 230 can be operable to store information related to trickplay rules associated with segments of a received multimedia stream (e.g., the number of times a boundary of a segment is crossed, or allowable trickplay actions taken by the client during playback of a segment, etc.). For example, the information related to the trickplay rules can be used to determine a state of an FSA which can control trickplay availability or functionality. In other implementations, the trickplay history data store 230 can be operable to store the current state of one or more identified FSAs in a multimedia stream. The trickplay history data store 230 can also be operable to store state information about the various segments in the stream (e.g., number of times a boundary associated with a segment has been crossed, whether a segment has been viewed in its entirety, a current location within the stream, a furthest segment viewed, etc.).

In some implementations, the trickplay history data store 230 can be operable to store an FSA controlling trickplay availability and functionality. For example, the trickplay history data store can be operable to store the one or more states of the FSA, state transition rule(s) (e.g., the number of times a boundary associated with a segment should be crossed before allowing trickplay of the segment), and state descriptor(s) (e.g., the trickplay actions allowed or disallowed within a particular state).

The client interface 240 can be operable to provide a client interface, for example, to a host computer in the case of a cable modem, or to a television for a set top box, etc. In some implementations, the client interface 240 can be operable to be used by a client to request a streaming video session. In other implementations, the client interface 240 can be operable to be used to receive segments of a streaming video session.

In some implementations, when a client selects a streaming video session for viewing through the client interface 240, a request to deliver the video session to the client can be sent from the server hosting the video session (e.g., web server 135 of FIG. 1) to the server storing the video session (e.g., streaming media server 140 of FIG. 1). After a request for a streaming video session is received by a server, the server (e.g. streaming media server 140 of FIG. 1) can break the requested video session into segments, place advertisement segments within the segmented video session, and construct a file comprising the video session segments and the advertisement segments (e.g., multimedia playlist 250).

In some implementations, the multimedia playlist 250 can comprise segments of a multimedia session. As an example, the multimedia session (e.g., live video, video-on-demand, etc.) can be segmented, and the segments can be placed into the multimedia playlist 250. In other implementations, advertisements (e.g., video or audio advertisements) can be placed in between segments of the multimedia session in the multimedia playlist 250. As an example, the number of advertisements placed in the multimedia playlist 250 and the frequency at which the advertisements are placed in the multimedia playlist 250 can be determined based upon properties and/or factors associated with the multimedia session (e.g., length of the session, popularity of the session, availability of the session, etc.). In still other implementations, the segments in the multimedia playlist 250 (e.g., multimedia session segment or advertisement segment) can be associated with an FSA. For example, the FSA can provide that certain trickplay functions (e.g., fast-forward, skip, etc.) be disabled during playback of the segment with which the FSA is associated until a predetermined condition is satisfied (e.g., viewing the segment a certain number of times, using certain trickplay functions during playback of the segment, or viewing the segment for a predetermined period of time). It should be appreciated that in some implementations, certain trickplay functionality can be allowed in any state (e.g., rewind, slow motion, etc.). The allowable trickplay functionality can be determined, for example, by a service operator setting the rules for a segment of the stream.

Figure 3:
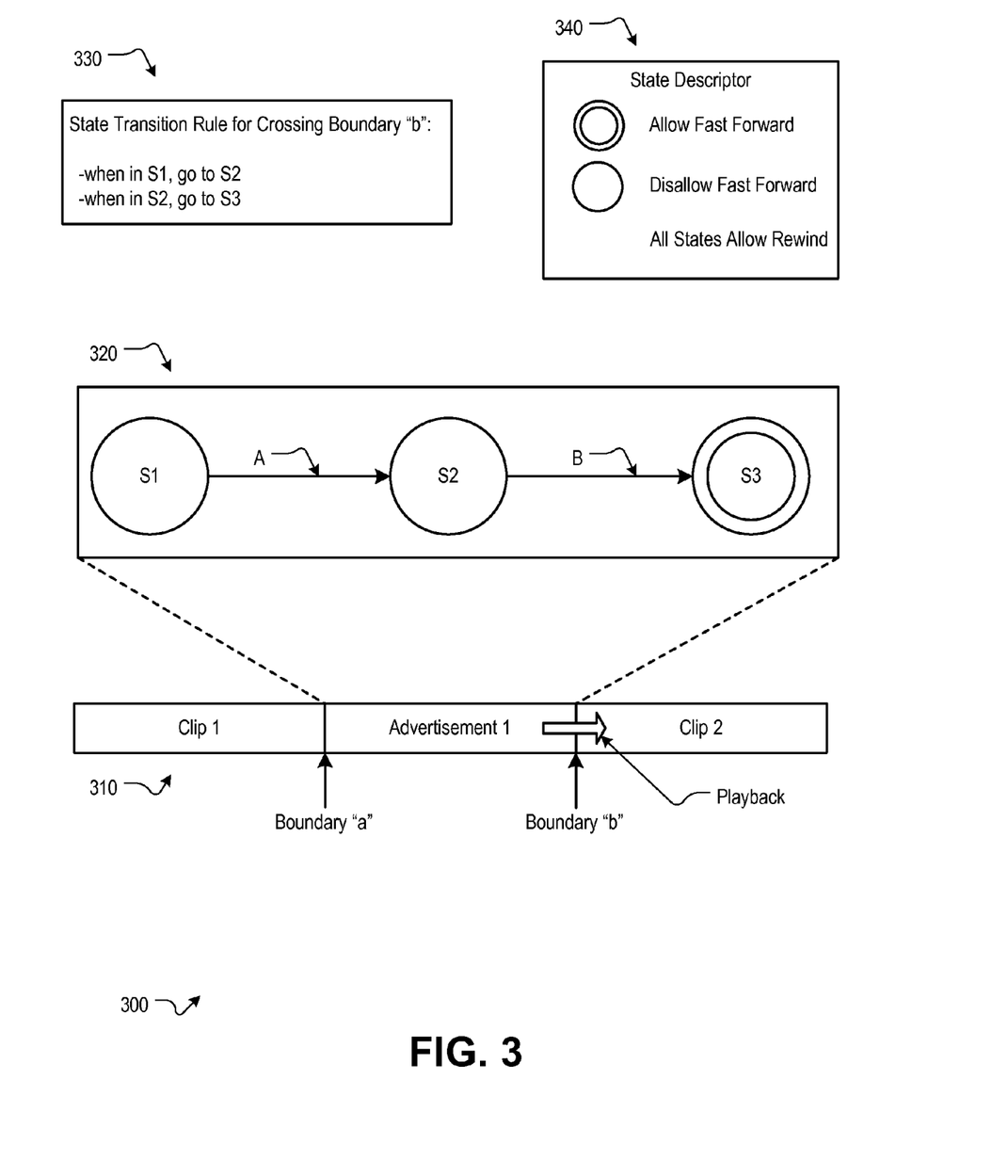
FIG. 3 is a block diagram illustrating an example finite state automaton operable to regulate trickplay control during playback of streaming multimedia.

FIG. 3 is a block diagram illustrating an example finite state automaton (FSA) 300 operable to regulate trickplay control during playback of streaming multimedia. In some implementations, the FSA 300 can include a multimedia playlist 310, FSA logic 320, a state transition rule 330 and a state descriptor 340.

In some implementations, a multimedia playlist 310 can comprise segments of a multimedia session (e.g., "Clip 1" and "Clip 2") with one or more advertisement segments (e.g., "Advertisement 1") located between segments of the multimedia session. In various implementations, a multimedia playlist 310 or manifest can be created by a server (e.g., streaming media server 140 of FIG. 1) and can be streamed in real-time to a CPE device. In some implementations, each of the segments (e.g., multimedia segments or advertisement segments) can be associated with FSA logic 320 to control trickplay of the multimedia playlist 310.

In some implementations, logic in an FSA 320 can map possible transitions for one or more states within a device (e.g., CPE device) receiving a multimedia stream (e.g., multimedia playlist 310). For example, one or more states (e.g., "S1," "S2" and "S3") in an FSA logic 320 can classify a status or designate a function or operation (e.g., trickplay fast forward or skip ahead) as available or unavailable for use by a device or system (e.g., CPE device). As another example, one or more transition paths (e.g., transition "A" and transition "B") between the one or more states can control when a device or system transitions from one state to another. In some implementations, the one or more transition lines can be controlled or defined by a rule based upon the occurrence of a predetermined condition (e.g., state transition rule 330).

FSA 300 is one example of a trickplay rule associated with the playback of an advertisement segment in a multimedia stream. In this example, the FSA logic 320 can operate as a countdown mechanism associated with the multimedia playlist 310 by requiring that an advertisement be viewed twice by a client before the fast-forward function is allowed to be used by the client during playback of the advertisement. Further in this example, the advertisement can be recognized as viewed when the boundary between the advertisement and the next clip in the playlist is crossed (e.g., boundary "b"). In this example, if the FSA logic 320 is in the initial state (S1) when the advertisement is recognized as viewed, the FSA logic 320 can transition to state 2 (S2) along transition path "A." Further in this example, if the FSA logic 320 is in S2 when the advertisement is recognized as viewed, the FSA logic 320 can transition to the final state (S3) along transition path "B."

In another implementation, the FSA logic 320 can be designed to respond to the client's use of the rewind function during playback of the advertisement. For example, this can be reflected by allowing a transition from S2 to S3 (e.g., transition B) if a rewind request is made during playback of the advertisement. Alternatively, this can be reflected by allowing a transition from S2 to S3 (e.g., transition B) if the boundary between the advertisement and the previous clip in the playlist (e.g., boundary "a") is crossed in either direction. In still another implementation, the FSA logic 320 can be designed to respond to the advertisement being viewed for a predetermined period of time. For example, this can be reflected by allowing a transition from one state to another after the advertisement is received by a client CPE device for a predetermined period of time (e.g., a period of time less than the full length of the advertisement). Thus, a rule might require that a viewer view a predetermined portion of the advertisement segment before being allowed to skip to the next segment in the multimedia stream.

While a mechanism is disclosed for requiring that an advertisement be viewed a specified number of times (e.g., twice) before allowing the fast-forward function, it should be understood that states (e.g., "S1," "S2," "S3," etc.) and transition lines (e.g., transition A, transition B, etc.) can be edited within FSA 300, deleted from and/or added to FSA 300 to design a mechanism for implementing a variety of trickplay policies based on interactions of a client with a multimedia stream (e.g., allowing and disallowing fast-forwarding, skipping, muting, exiting, etc. during playback of streaming multimedia). Further, states and transition lines can be added or deleted from FSA 300 to design a mechanism for disallowing a trickplay function until any number of client-interactions with a multimedia stream occurs or for a specified time period.

In some implementations, a state transition rule 330 can control when FSA logic 320 transitions from one state to another. For example, when the FSA logic 320 is in the initial state (S1) and playback of the multimedia playlist 310 crosses the end boundary of an advertisement (e.g., Boundary "b" of Advertisement 1), the state transition rule 330 instructs the FSA logic 320 to transition from S1 to state 2 (S2). Also in this example, when the FSA logic 320 is in S2 and playback of the multimedia playlist 310 crosses the end boundary of an advertisement (e.g., Boundary "b" of Advertisement 1), the state transition rule 330 instructs the FSA logic 320 to transition from S2 to state 3 (S3). In other implementations, the state transition rule 330 can be designed to control when the FSA logic 320 transitions from one state to another based upon other conditions being met (e.g., the rewind function being used during playback of the advertisement, the beginning boundary of the advertisement being crossed by the playback in either direction, a predetermined length of the advertisement being received by a client CPE device, a fee being paid by the viewer, etc.).

In some implementations, external state information can be associated with a user and provided to the FSA logic 320

(e.g., a user can pay a fee to have the ability to fast-forward or skip advertisement segments in a multimedia stream). For example, a token indicating that a user has paid a fee to be able to control trickplay during advertisement segments can be provided to the FSA logic 320, thereby directing the FSA logic to transition to a state allowing trickplay actions. In various implementations, a client can be debited upon skipping or fast-forwarding an advertisement segment. In some implementations, a fee schedule for allowing specified trickplay actions during playback of an advertisement segment can be based on the advertisement and/or the multimedia associated with the advertisement (e.g., the length of the advertisement, the demand for the multimedia associated with the advertisement, etc.). For example, when a viewer attempts to skip or fast-forward an advertisement, a window can be displayed giving the viewer the option to skip or fast-forward the advertisement and identifying the fee associated with allowing available trickplay actions.

In some implementations, a state descriptor 340 can denote one or more types of states for FSA logic 320. For example, a circle can denote a non-final state in which fast-forwarding playback of the associated segment is disallowed, and two concentric circles can denote a final state in which fast-forwarding playback of the associated segment is allowed. In this example, a global state descriptor can provide that rewinding is allowed in all states of the FSA logic 320. In other implementations, a state descriptor 340 can denote states allowing or disallowing other functions during the playback of a multimedia segment (e.g., skipping a segment, muting audio playback, minimizing a viewing window, etc.).

Figure 4:
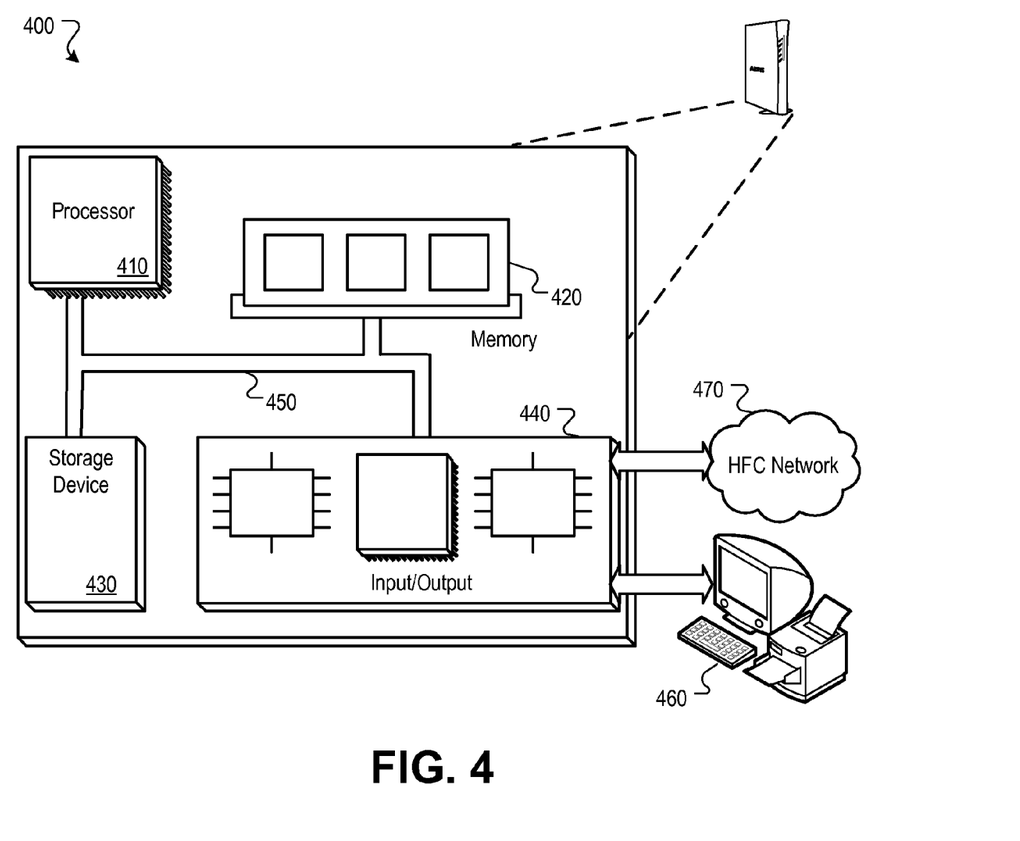
FIG. 4 is a block diagram of a hardware configuration operable to facilitate regulating trickplay control during playback of streaming multimedia.

FIG. 4 is a block diagram of a hardware configuration 400 operable to facilitate regulating trickplay control during playback of streaming multimedia. While a cable modem is shown in this example, it should be understood that many different kinds of devices (e.g., set-top-boxes, DSL modems, wireless routers, consumer electronic devices, etc.) can include systems and processes to facilitate regulating trickplay control during playback of streaming multimedia. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the system 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the device 400. In one implementation, the storage device 430 can be a computer-readable medium. In various different implementations, the storage device 430 can, for example, include a hard disk device, an optical disk device, flash memory or some other large capacity storage device.

The input/output device 440 can provide input/output operations for the hardware configuration 400. In one implementation, the input/output device 440 can include one or more of a network interface device (e.g., an Ethernet card), a serial communication device (e.g., an RS-232 port), and/or a wireless interface device (e.g., an 802.11 card). In another implementation, the input/output device 440 can include driver devices configured to receive input data and send output data to other input/output devices, such as one or more display devices 460 (e.g., computer, television, communication device, tablet, etc.), as well as sending communications to, and receiving communications from a network 470. For example, the driver devices of the input/output device 440 can be configured to receive segments of a multimedia stream (e.g., multimedia playlist 250 of FIG. 2).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A system, comprising:
   an interface operable to receive a segment of a multimedia stream, the segment comprising one or more packets identifying the segment as an advertisement segment and one or more packets identifying a finite state machine controlling the availability of trickplay functions during playback of the segment, wherein the multimedia stream is output from a playlist stored at an upstream server using an adaptive bitrate streaming protocol, and the finite state machine comprises:
      a plurality of states associated with one or more flags that control the availability of one or more user requested trickplay functions to be performed on the segment of the multimedia stream; and
      one or more state transitions controlled by the number of times one or more boundaries associated with the received segment of the multimedia stream are crossed;
   a data store operable to store the number of times one or more boundaries associated with the received segment of the multimedia stream have been crossed;
   a processor operable to execute said computer program instructions, the computer program instructions being operable to cause the processor to:
      upon reception of the segment, recognize the finite state machine associated with the received segment of the multimedia stream;
      identify a current state of the finite state machine associated with the received segment of the multimedia stream based on the number of times one or more boundaries associated with the received segment of the multimedia stream have been crossed;
      set the flag associated with the current state of the finite state machine, wherein the flag enables or disables one or more trickplay functions during playback of the segment; and
      transition from the current state of the finite state machine to a next state in response to the one or more boundaries associated with the received segment of the multimedia stream being crossed a predetermined number of times, the predetermined number being based upon a status of a subscriber receiving the multimedia stream.

2. The system of claim 1, wherein the one or more flags control available trickplay behavior of a specific segment of the multimedia stream.

3. The system of claim 1, wherein the one or more flags restrict user ability to fast-forward through or skip a specific segment of the multimedia stream.

4. The system of claim 1, wherein the one or more flags restrict user ability to minimize the viewing window of a specific segment of the multimedia stream.

5. The system of claim 1, wherein the status of the subscriber is based upon the subscriber using a rewind function during playback of a specific segment of the multimedia stream.

6. The system of claim 1, wherein the status of the subscriber is based upon the display of multimedia content associated with the multimedia stream by the subscriber for a predetermined period of time.

7. The system of claim 1, wherein the status of the subscriber is based upon an agreement by the subscriber to pay a fee.

8. The system of claim 1, wherein the finite state machine associated with the segment of the multimedia stream is embedded in a playlist associated with the multimedia stream.

9. A computer-implemented method, comprising:
associating a segment of a multimedia stream with a finite state machine, wherein the segment comprises one or more packets identifying the segment as an advertisement segment and one or more packets identifying the finite state machine controlling the availability of trickplay functions during playback of the segment;
associating a plurality of states in the finite state machine with one or more flags that control the availability, to a subscriber, of one or more user requested trickplay functions that may be performed on the segment of the multimedia stream during playback of the segment;
identifying a current state of the finite state machine associated with the segment of the multimedia stream based on the number of times one or more boundaries associated with the segment of the multimedia stream have been crossed; and
transitioning from the current state to a next state when one or more boundaries of the segment of the multimedia stream are crossed a predetermined number of times, the predetermined number of times being based upon a status of a subscriber receiving the segment of the multimedia stream.

10. The computer-implemented method of claim 9, wherein the one or more flags control available trickplay behavior of a specific segment of the multimedia stream.

11. The computer-implemented method of claim 9, wherein the one or more flags restrict user ability to fast-forward through or skip a specific segment of the multimedia stream.

12. The computer-implemented method of claim 9, wherein the one or more flags restrict user ability to minimize the viewing window of a specific segment of the multimedia stream.

13. The computer-implemented method of claim 9, wherein the status of the subscriber is based upon the subscriber using a rewind function during playback of a specific segment.

14. The computer-implemented method of claim 9, wherein the status of the subscriber is based upon an agreement by the subscriber to pay a fee, the fee being based upon one or more trickplay functions requested by the subscriber.

15. One or more non-transitory computer readable media operable to execute on a processor, the computer readable being operable to cause the processor to perform the operations comprising:
associating a segment of a multimedia stream with a finite state machine, wherein the segment comprises one or more packets identifying the segment as an advertisement segment and one or more packets identifying the finite state machine controlling the availability of trickplay functions during playback of the segment;
associating a plurality of states in the finite state machine with one or more flags that control the availability, to a subscriber, of one or more user requested trickplay functions that may be performed on the segment of the multimedia stream during playback of the segment;
identifying an initial state of the finite state machine associated with the segment of the multimedia stream based on the number of times one or more boundaries associated with the segment of the multimedia stream have been crossed; and
transitioning to one or more other states when one or more boundaries of the segment of the multimedia stream are crossed a predetermined number of times, the predetermined number of times being based upon a status of a subscriber receiving the segment of the multimedia stream.

16. The one or more computer-readable media of claim 15, wherein the one or more flags control available trickplay behavior of a specific segment of the multimedia stream.

17. The one or more computer-readable media of claim 15, wherein the one or more flags restrict user ability to fast-forward, skip, mute the audio of, or minimize the viewing window of a specific segment of the multimedia stream.

18. The one or more computer-readable media of claim 15, wherein the status of the subscriber is based upon the subscriber using a rewind function during playback of a specific segment.

19. The one or more computer-readable media of claim 15, wherein the status of the subscriber is based upon an agreement by the subscriber to pay a fee, the fee being based upon one or more trickplay functions requested by the subscriber.

* * * * *